L. B. GAYLOR.
DEVICE FOR LOCATING THE DEFECTIVELY OPERATING PARTS IN AUTOMOBILE MOTORS AND OTHER MECHANISM.
APPLICATION FILED MAR. 15, 1910.
999,496.
Patented Aug. 1, 1911.
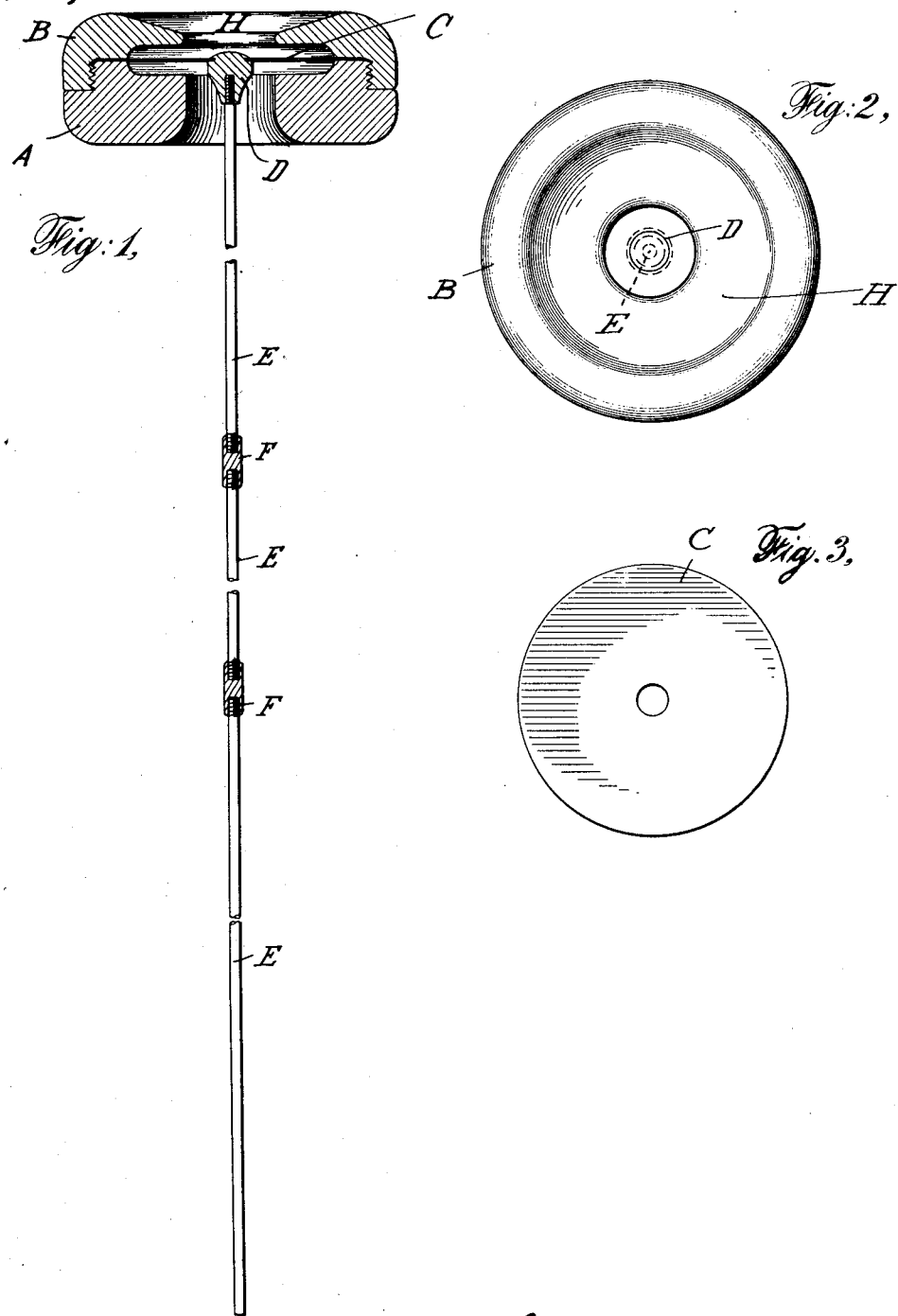

UNITED STATES PATENT OFFICE.

LEONARD B. GAYLOR, OF STAMFORD, CONNECTICUT.

DEVICE FOR LOCATING THE DEFECTIVELY-OPERATING PARTS IN AUTOMOBILE-MOTORS AND OTHER MECHANISM.

999,496. Specification of Letters Patent. Patented Aug. 1, 1911.

Application filed March 15, 1910. Serial No. 549,494.

*To all whom it may concern:*

Be it known that I, LEONARD B. GAYLOR, a citizen of the United States, and a resident of the city of Stamford, county of Fairfield, State of Connecticut, have invented a new and useful Device for Locating the Defectively-Operating Parts in Automobile-Motors and other Mechanism, of which the following is a specification, reference being had to the accompanying drawings, in which—

Figure 1 illustrates an elevation, partly in section, of one form of apparatus embodying the invention; Fig. 2 illustrates a plan view of that which is shown in Fig. 1; Fig. 3 illustrates a plan view of the diaphragm of the device.

It frequently happens that the defective operation of machinery, particularly motors used in automobiles, launches, and the like, is evinced by shocks, knocks or jars, but the part producing such shocks, jars or knocks cannot be located by hearing alone, because of the impossibility of determining at what precise point the knock or jar originates, owing to the noises which normally exist in the running of such machinery, and also in many cases because the operator cannot get into close enough proximity to the mechanism. Because of these facts, a great deal of time and expense is consumed in the useless disorganization of the mechanism, which disorganization is frequently several times repeated before the defect can be located and remedied.

It is the purpose, therefore, of this present invention to provide a device whereby the part of the mechanism in which the defective operation arises may be quickly and accurately ascertained without disorganization thereof in any particular, so that the necessary repairs may be quickly and inexpensively made.

Referring to the drawings, A represents the body of the receiver or ear piece, B the upper part of the ear piece threaded as shown to the body piece A. These parts may be made of any suitable material, such as hard rubber, wood, fiber or metal.

C represents the diaphragm, preferably a piece of sheet metal, or other suitable substance. It is clamped in place between the parts A and B of the ear piece by screwing them together as indicated in Fig. 1. The diaphragm is provided with a nipple D made of metal, or other suitable material, firmly secured to the diaphragm at its central part, into which nipple is screwed what I call the test rod E, which may be of any suitable construction and material, provided it has the necessary rigidity. I prefer to employ a slender metallic structure which may beneficially be an eighth of an inch or less in diameter, and of such length as desired, depending upon the uses to which it is to be put, ordinarily from eighteen inches to three feet long. I preferably make this test rod in sections of desired length which may be united by couplers F so that the device may be conveniently packed in a box for transportation.

The operation is as follows: The apparatus being properly put together, that is to say, the upper section of the test rod E screwed into the diaphragm nipple D, then the desired number of test rod sections E are firmly connected together by means of the couplers F, thus making a long, continuous and relatively rigid rod projecting from the diaphragm, the lower end thereof, which is small in size and preferably somewhat flexible, is then placed successively on the various parts of the running motor, while the operator holds the ear piece of the device at or near his ear. By this means the exact location of the loose or defective part of the mechanism causing the knock, pound, or jar, may be quickly and accurately determined because as the vibration or jar is transmitted through the test rod to the diaphragm of the instrument, the sound thereof becomes louder as the end of the test rod approaches more nearly to the cause of trouble, and correspondingly less loud as the free end of the test rod recedes from the cause of trouble. In this way, by moving the end of the test rod and applying it to different portions of the mechanism, the source of trouble may be accurately, quickly and inexpensively located.

I call particular attention to the following structural features of my device: It operates on a totally different principle from that of the stethoscope, because in the latter the instrument is applied to a relatively large area of the soft and yielding body of the patient, and the atmospheric vibrations or pulsations resulting from the operation of the organs within the body, are transmitted through a hollow, or equivalent confining device, to the ears of the auditor. This construction is unsuited for the purpose I have in mind, because I wish to transmit, not the sound of the jar, but the jar itself, from the rigid surface of the mechanism through the rigid or at least sufficiently rigid test rod to the diaphragm of the device which is arranged close to the ear of the auditor, so that the resulting sound will be transmitted forcibly and direct to the ear of the auditor. Also the free end of the test rod is small in area so that it may be readily introduced through small spaces in the mechanism and thus be placed against parts thereof which would otherwise be inaccessible. Also since the test rod is preferably made of metal, it will not be injured even if brought in contact with highly heated surfaces.

It will be obvious to those who are familiar with such matters that the details of the construction illustrated in the drawings and described in this specification may be departed from and still the essentials of the invention be employed.

That which I have illustrated and described shows one form only which I have found by actual construction and use to be a desirable one.

I claim:

1. A device for the purpose stated, embodying a hollow combined ear piece and diaphragm casing entirely open at both sides, a diaphragm in the casing, a nipple centrally connected to the diaphragm, and a rigid test rod attached to said nipple.

2. A device for the purpose stated, embodying a two part hollow combined ear piece and diaphragm casing entirely open at both sides, a diaphragm clamped between the two parts of the combined ear piece and diaphragm casing, a nipple permanently connected to the center of the diaphragm, and a rigid test rod adapted to be detachably attached to said nipple.

3. A device for the purpose stated, embodying a hollow combined ear piece and diaphragm casing entirely open at both sides, a diaphragm held by the combined ear piece and diaphragm casing, a nipple centrally connected to the diaphragm, and a rigid test rod connected to the said nipple, the unconnected end of which rod is made of non-combustible material.

In testimony whereof I have signed my name to this specification in the presence of two subscribing witnesses.

LEONARD B. GAYLOR.

Witnesses:
EDWIN F. VALENTINE,
F. M. DONSBACH.